(12) United States Patent
Pechanek et al.

(10) Patent No.: US 7,506,137 B2
(45) Date of Patent: *Mar. 17, 2009

(54) METHODS AND APPARATUS FOR INITIATING AND RESYNCHRONIZING MULTI-CYCLE SIMD INSTRUCTIONS

(75) Inventors: Gerald George Pechanek, Cary, NC (US); David Strube, Raleigh, NC (US); Edward A. Wolff, Stockton, CA (US); Edwin Franklin Barry, Vilas, NC (US); Grayson Morris, Eindhoven, NE (US); Carl Donald Busboom, Cary, NC (US); Dale Edward Schneider, Durham, NC (US)

(73) Assignee: Altera Corporation, San Jose, CA (US)

( * ) Notice: Subject to any disclaimer, the term of this patent is extended or adjusted under 35 U.S.C. 154(b) by 14 days.

This patent is subject to a terminal disclaimer.

(21) Appl. No.: 11/778,303

(22) Filed: Jul. 16, 2007

(65) Prior Publication Data

US 2008/0133892 A1 Jun. 5, 2008

Related U.S. Application Data

(63) Continuation of application No. 10/641,441, filed on Aug. 15, 2003, now Pat. No. 7,257,696, which is a continuation of application No. 09/598,564, filed on Jun. 21, 2000, now Pat. No. 6,622,234.

(60) Provisional application No. 60/140,162, filed on Jun. 21, 1999.

(51) Int. Cl.
*G06F 9/302* (2006.01)
(52) U.S. Cl. ........................................................ 712/24
(58) Field of Classification Search .................... 712/23, 712/24; 708/504, 525, 605, 650
See application file for complete search history.

(56) References Cited

U.S. PATENT DOCUMENTS 6,622,234 B1 * 9/2003 Pechanek et al. .............. 712/22
7,257,696 B2 * 8/2007 Pechanek et al. .............. 712/24

* cited by examiner

*Primary Examiner*—William M Treat
(74) *Attorney, Agent, or Firm*—Priest & Goldstein, PLLC (57) ABSTRACT

Techniques for adding more complex instructions and their attendant multi-cycle execution units with a single instruction multiple data stream (SIMD) very long instruction word (VLIW) processing framework are described. In one aspect, an initiation mechanism also acts as a resynchronization mechanism to read the results of multi-cycle execution. This multi-purpose mechanism operates with a short instruction word (SIW) issue of the multi-cycle instruction, in a sequence processor (SP) alone, with a VLIW, and across all processing elements (PEs) individually or as an array of PEs. A number of advantageous floating point instructions are also described.

22 Claims, 9 Drawing Sheets

DIV ENCODING

| 31 30 29 | 28 27 26 | 25 24 23 22 21 | 20 19 18 17 16 | 15 14 13 12 11 | 10 9 8 7 6 | 5 4 3 | 2 1 0 |
|---|---|---|---|---|---|---|---|
| GROUP | S/P UNIT | DSUopcode | Rt | Rx | Ry | DivExt | CE3 |

FIG. 3B

DIV SYNTAX/OPERATION

| INSTRUCTION | OPERANDS | OPERATION | ACF |
|---|---|---|---|
| | | | WORD |
| DIV.[SP][D.1[SU]W | Rt, Rx, Ry | IN THE FIRST EXECUTION CYCLE:[1]<br>Rt ← CURRENT VALUE OF DSOR<br>C ← DCO FROM SCR1<br>N ← DNO FROM SCR1<br>V ← DVO FROM SCR1<br>Z ← DZO FROM SCR1<br>AT THE END OF THE LAST CYCLE OF THE MULTI-CYCLE OPERATION<br>DSOR ← Rx/Ry<br>MODR ← REMAINDER OF Rx/Ry<br>DCO, DNO, DVO, AND DZO FIELDS IN THE SCR1 ← Rx/Ry<br>FLAGS GENERATED | NONE |
| DIV[CNVZ].[SP][D.1[SU]W | Rt, Rx, Ry | DO OPERATION ABOVE<br>IN THE FIRST EXECUTION CYCLE:[1]<br>F0 ← SPECIFIED DCO, DNO, DVO, OR DZO FLAG FROM SCR1 | F0 |
| [TF].FDIV.[SP][D.1[SU]W | Rt, Rx, Ry | DO OPERATION ONLY IF T/F CONDITION IS SATISFIED IN F0 | NONE |
| | | | DUAL HALFWORDS |
| DIV.[SP][D.1[SU]H | Rt, Rx, Ry | IN THE FIRST EXECUTION CYCLE:[1]<br>RtH1 ← CURRENT VALUE OF DSORH1<br>RtH0 ← CURRENT VALUE OF DSORH0<br>C ← DCO FROM SCR1<br>N ← DNO FROM SCR1<br>V ← DVO FROM SCR1<br>Z ← DZO FROM SCR1<br>AT THE END OF THE LAST CYCLE OF THE MULTI-CYCLE OPERATION:<br>DSORH1 ← RxH1/RyH1<br>DSORH0 ← RxH0/RyH0<br>MODRH1 ← REMAINDER OF RxH1/RyH1<br>MODRH0 ← REMAINDER OF RxH0/RyH0<br>DC1, DN1, DV1, AND DZ1 FIELDS IN THE SCR1 ← RxH1/RyH1 FLAGS GENERATED<br>DCO, DNO, DVO, AND DZO FIELDS IN THE SCR1 ← RxH0/RyH0 FLAGS GENERATED | NONE |
| DIV[CNVZ].[SP][D.2[SU]H | Rt, Rx, Ry | DO OPERATION ABOVE<br>IN THE FIRST EXECUTION CYCLE:[1]<br>F1 ← SPECIFIED DC1, DN1, DV1, OR DZ1 FLAG FROM SCR1<br>F0 ← SPECIFIED DCO, DNO, DVO, OR DZO FLAG FROM SCR1 | F1-F0 |
| [TF].DIV.[SP][D.2[SU]H | Rt, Rx, Ry | DO OPERATION ONLY IF T/F CONDITION IS SATISFIED IN F0 | NONE |

FIG. 4A

FDIV ENCODING

| 31 30 29 | 28 27 | 26 25 24 23 22 | 21 20 19 18 17 16 | 15 14 13 12 11 | 10 9 8 7 6 | 5 4 3 | 2 1 0 |
|---|---|---|---|---|---|---|---|
| GROUP | S/P | UNIT | DSUopcode | Rt | Rx | Ry | FdivExt | CE3 |

FIG. 4B

FLOATING-POINT DIVISION OPERATIONS WITH ZERO, NAN AND INFINITY VALUES

| FLOATING-POINT OPERAND | | 2nd FLOATING-POINT OPERAND | | MANARRAY FLOATING-POINT RESULT | ARITHMETIC FLAGS |
|---|---|---|---|---|---|
| SIGN | VALUE | SIGN | VALUE | | |
| 0 | NAN OR INF | 0 | NON-ZERO | $+1.9999..\times 2^{127}$ | V=1, N=0, Z=0 |
| 0 | NAN OR INF | 1 | NON-ZERO | $-1.9999..\times 2^{127}$ | V=1, N=1, Z=0 |
| 0 | NAN OR INF | 0/1 | ZERO | $+1.9999..\times 2^{127}$ | V=1, N=0, Z=0 |
| 0 | NAN OR INF | 0 | NAN OR INF | 1 | V=1, Z=0, N=0 |
| 0 | NAN OR INF | 1 | NAN OR INF | -1 | V=1, Z=0, N=1 |
| 1 | NAN OR INF | 0 | NON-ZERO | $-1.9999..\times 2^{127}$ | V=1, N=1, Z=0 |
| 1 | NAN OR INF | 1 | NON-ZERO | $+1.9999..\times 2^{127}$ | V=1, N=0, Z=0 |
| 1 | NAN OR INF | 0/1 | ZERO | $-1.9999..\times 2^{127}$ | V=1, N=1, Z=0 |
| 1 | NAN OR INF | 0 | NAN OR INF | -1 | V=1, Z=0, N=1 |
| 1 | NAN OR INF | 1 | NAN OR INF | 1 | V=1, Z=0, N=0 |
| 0 | NON-ZERO | 0 | NAN OR INF | +0 | V=1, N=0, Z=1 |
| 0 | NON-ZERO | 1 | NAN OR INF | +0 | V=1, N=0, Z=1 |
| 0 | NON-ZERO | 0/1 | ZERO | $+1.9999..\times 2^{127}$ | V=1, N=0, Z=0 |
| 1 | NON-ZERO | 0 | NAN OR INF | +0 | V=1, N=0, Z=1 |
| 1 | NON-ZERO | 1 | NAN OR INF | +0 | V=1, N=0, Z=1 |
| 1 | NON-ZERO | 0/1 | ZERO | $-1.9999..\times 2^{-27}$ | V=1, N=1, Z=0 |
| 0/1 | ZERO | 0 | NAN OR INF | +0 | V=1, N=0, Z=1 |
| 0/1 | ZERO | 1 | NAN OR INF | +0 | V=1, N=0, Z=1 |
| 0/1 | ZERO | 0/1 | ZERO | +0 | V=1, N=0, Z=1 |
| A NON-NORMALIZED RESULT OF AN OPERATION IS FLUSHED TO ZERO | | | | | |

FDIV SYNTAX/OPERATION

| INSTRUCTION | OPERANDS | OPERATION | ACF |
|---|---|---|---|
| FDIV.[SPID.1FW | Rt, Rx, Ry | IN THE FIRST EXECUTION CYCLE: (1)<br>Rt ← CURRENT VALUE OF DSOR<br>C FLAG ← DC0 FROM THE SCR1<br>N FLAG ← DN0 FROM THE SCR1<br>V FLAG ← DV0 FROM THE SCR1<br>Z FLAG ← DZ0 FROM THE SCR1<br>AT THE END OF THE LAST CYCLE OF THE MULTI-CYCLE OPERATION:<br>DSOR ← Rx/Ry<br>DD0, DN0, DV0, AND DZ0 FIELDS IN THE SCR1 ← FLAGS GENERATED | NONE |
| FDIV[CNVZ].[SPID.1FW | Rt, Rx, Ry | DO OPERATION ABOVE<br>IN THE FIRST EXECUTION CYCLE:<br>SET THE CNVZ FLAGS AS ABOVE, THEN<br>F0 ACF FLAG ← THE SPECIFIED CNVZ FLAG | F0 |
| [TF].FDIV.[SPID.1FW | Rt, Rx, Ry | DO OPERATION ONLY IF T/F CONDITION IS SATISFIED IN F0 | NONE |

FIG. 5A ⟵ 500

FSQRT ENCODING

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | DSUopcode | | | | | | Rt | | | | | Rx | | | | 0 | 0 | 0 | 0 | 0 | | FsqrtExt | | CE3 | | |

FIG. 5B ⟵ 510

FSQRT SYNTAX/OPERATION

| INSTRUCTION | OPERANDS | OPERATION | ACF |
|---|---|---|---|
| FSQRT.[SP]D.1FW | Rt, Rx | IN THE FIRST EXECUTION CYCLE:[1]<br>Rt ⟵ CURRENT VALUE OF DSQR<br>C FLAG ⟵ DCO FLAG FIELD FROM THE SCR1<br>N FLAG ⟵ DNO FLAG FIELD FROM THE SCR1<br>V FLAG ⟵ DVO FLAG FIELD FROM THE SCR1<br>Z FLAG ⟵ DZO FLAG FIELD FROM THE SCR1<br>AT THE END OF THE LAST CYCLE OF THE MULTI-CYCLE OPERATION:<br>DSQR ⟵ $Rx^{1/2}$<br>DCO, DNO, DVO, AND DZO FIELDS IN THE SCR1 ⟵ FLAGS GENERATED | NONE |
| FSQRT[CNVZ].[SP]D 1FW | Rt, Rx | DO OPERATION ABOVE<br>IN THE FIRST EXECUTION CYCLE:[1]<br>SET THE CNVZ FLAGS AS ABOVE, THEN<br>F0 ACF FLAG ⟵ THE SPECIFIED CNVZ FLAG | F0 |
| [TF].FSQRT.[SP]D.1FW | Rt, Rx | DO OPERATION ONLY IF SPECIFIED CONDITION IS SATISFIED IN F0 | NONE |

FIG. 6A

FRCP ENCODING

600

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | DSUopcode | | | | | | Rt | | | | | | Rx | | | | 0 | 0 | 0 | 0 | 0 | FdivExt | | | CE3 | |

FIG. 6B

FRCP SYNTAX/OPERATION

610

| INSTRUCTION | OPERANDS | OPERATION | ACF |
|---|---|---|---|
| FRCP.{SP}0.1FW | Rt, Rx | IN THE FIRST EXECUTION CYCLE:(1)<br>Rt ← CURRENT VALUE OF DSOR<br>C FLAG ← DC0 FLAG FIELD FROM THE SCR1<br>N FLAG ← DN0 FLAG FIELD FROM THE SCR1<br>V FLAG ← DV0 FLAG FIELD FROM THE SCR1<br>Z FLAG ← DZ0 FLAG FIELD FROM THE SCR1 ← FLAGS GENERATED<br>AT THE END OF THE LAST CYCLE OF THE MULTI-CYCLE OPERATION:<br>DSOR ← 1/Rx<br>DD0, DN0, DV0, AND DZ0 FIELDS IN THE SCR1 | NONE |
| FCRP{CNVZ}.{SP}0.1FW | Rt, Rx | DO OPERATION ABOVE<br>IN THE FIRST EXECUTION CYCLE:(1)<br>SET THE CNVZ FLAGS AS ABOVE, THEN<br>F0 ACF FLAG ← THE SPECIFIED CNVZ FLAG | F0 |
| {TF}.FRCP.{SP}0.1FW | Rt, Rx | DO OPERATION ONLY IF T/F CONDITION IS SATISFIED IN F0 | NONE |

FIG. 7A

FRSQRT ENCODING — 700

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| GROUP | | S/P | UNIT | | | DSUopcode | | | | | | Rt | | | | | | Rx | | | | 0 | 0 | 0 | 0 | 0 | Fsqrt Ext | | | CF3 | |

FIG. 7B

FRSQRT SYNTAX/OPERATION — 710

| INSTRUCTION | OPERANDS | OPERATION | ACF |
|---|---|---|---|
| FRSQRT.{SP}D.1FW | Rt, Rx | IN THE FIRST EXECUTION CYCLE: (1)<br>Rt ← CURRENT VALUE OF DSQR<br>C FLAG ← DC0 FLAG FIELD FROM THE SCR1<br>N FLAG ← DN0 FLAG FIELD FROM THE SCR1<br>V FLAG ← DV0 FLAG FIELD FROM THE SCR1<br>Z FLAG ← DZ0 FLAG FIELD FROM THE SCR1<br>AT THE END OF THE LAST CYCLE OF THE MULTI-CYCLE OPERATION:<br>DSQR ← 1/Rx$^{1/2}$<br>DC0, DN0, DV0, AND DZ0 FIELDS IN THE SCR1 ← FLAGS GENERATED | NONE |
| FRSQRT(CNVZ).{SP}D.1FW | Rt, Rx | DO OPERATION ABOVE<br>IN THE FIRST EXECUTION CYCLE: (1)<br>SET THE CNVZ FLAGS AS ABOVE, THEN<br>F0 ACF FLAG ← THE SPECIFIED CNVZ FLAG | F0 |
| (IF).FRSQRT.{SP}D.1FW | Rt, Rx | DO OPERATION ONLY IF SPECIFIED CONDITION IS SATISFIED IN F0 | NONE |

FIG. 8

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| S | | | EXPONENT (e) | | | | | | | | | | | | | | | FRACTION | | | | | | | | | | | | | |
| MSB | | | | | | | LSB | MSB | | | | | | | | | | | | | | | | | | | | | | | LSB |

800

WHERE:

S = 0 = POSITIVE VALUE, 1 = NEGATIVE VALUE.

EXPONENT (e) = EXPONENT VALUE BIASED BY + 127 SUCH THAT e = E + 127

FRACTIONAL = FRACTIONAL VALUE

PRECISION = 24 BITS

MSB = MOST SIGNIFICANT BIT

LSB = LEAST SIGNIFICANT BIT

AND:

| | VALUE | REPRESENTS AN EXPONENT |
|---|---|---|
| EMAX | 127 | 1111 1110 |
| EMIN | -126 | 0000 0001 |
| EMAX+1 | | 1111 1111 |
| EMIN-1 | | 0000 0000 |
| EXPONENT BIAS | 127 | |

METHODS AND APPARATUS FOR INITIATING AND RESYNCHRONIZING MULTI-CYCLE SIMD INSTRUCTIONS

RELATED APPLICATIONS

This application is a continuation of U.S. application Ser. No. 10/641,441 filed Aug. 15, 2003, now U.S. Pat. No. 7,257,696 which is a continuation of U.S. Ser. No. 09/598,564 filed Jun. 21, 2000, now U.S. Pat. No. 6,622,234 and claims the benefit of U.S. Provisional Application Ser. No. 60/140,162 filed Jun. 21, 1999, all of which are incorporated by reference herein in their entirety.

FIELD OF THE INVENTION

The present invention relates generally to improved array processing using multi-cycle execution units in a single instruction multiple data stream (SIMD) very long instruction word (VLIW) array processor.

BACKGROUND OF THE INVENTION

In an architecture, such as the manifold array (ManArray) processor, VLIWs are created from multiple short instruction words (SIWs), stored in a VLIW memory (VIM), and executed by an SIW execute VLIW (XV) instruction. The pipeline used in the processor is a dynamically reconfigured pipeline which supports a distributed VIM in each of the processing elements (PEs) in the array processor. See, for example, "Methods and Apparatus to Dynamically Reconfigure the Instruction Pipeline of An Indirect Very Long Instruction Word Scalable Processor" U.S. patent application Ser. No. 09/228,374 filed Jan. 12, 1999, and incorporated by reference herein in its entirety.

The execution phase of the pipeline is relatively simple consisting of either single or dual execution cycles depending upon the instruction. This pipeline works fine for relatively simple instruction types, but has certain limitations in its support of more complex instructions which cannot complete their execution within a two-cycle maximum limit specified by an initial ManArray implementation. A VLIW processor, having variable execution periods can cause undesirable complexities for both implementation and for programming. It thus became desirable to solve the problem of how to add more complex instruction types in a SIMD array indirect VLIW processor such as the ManArray processor to support the evolution of this processor to a further range of applications.

SUMMARY OF THE INVENTION

The present invention describes advantageous techniques for adding more complex instructions and their consequent greater than 2-cycle multi-cycle execution units within a SIMD VLIW framework. Each PE in the array processor supports the technique and a single XV instruction can initiate several multi-cycle instructions to begin execution. In one aspect, the invention employs an initiation mechanism to also act as a resynchronization mechanism to read the results of the greater than 2-cycle multi-cycle execution. This multipurpose mechanism operates with an SIW issue of the multi-cycle instruction, in the sequence processor (SP) alone, within a VLIW, and across all PEs individually or as an array of PEs. In addition, the multi-cycle instruction is an SIW which can be encapsulated within a VLIW and loaded indirectly with a load VLIW (LV) instruction and cause its execution to begin with an XV instruction.

The multi-cycle instruction, which by definition takes greater than 2-cycles to complete, is allowed to execute within one of the existing execution unit modules, but independently of the other module SIW instructions. The results of the multi-cycle instruction are stored in a separate storage register at completion of its operation. This approach is different than the normal single or dual execution cycle instructions that write their result data to the compute register file (CRF) at completion of the execution cycle. Upon receipt of the next multi-cycle SIW in the SP or any PE, whether it be in a VLIW or to be executed as an SIW, the contents of the multi-cycle instruction result register are transferred to the target register specified in the multi-cycle SIW. This approach allows complex execution units supporting different numbers of execution cycles to coexist within the same execution unit and within the same programming model. For example, a divide and square root unit, supporting multiple instruction types, is used in the SP and each PE in the ManArray processor with the following execution latencies for an exemplary implementation:

| | |
|---|---|
| dual 16-bit Integer Divide | 6-cycles |
| 32-bit Integer Divide | 10-cycles |
| Single Precision Floating Point Divide | 8-cycles |
| Single Precision Floating Point Reciprocal | 8-cycles |
| Single Precision Floating Point Square Root | 8-cycles |
| Single Precision Floating Point Reciprocal Square Root | 16-cycles |

For implementation reasons, the divide square root unit takes the indicated number of execution unit cycles to complete before another divide and square root type of instruction can be issued to the unit. In one aspect of the present invention, the programming model takes the execution latencies into account when scheduling new instruction dispatching. The divide square root unit instructions are all advantageously implemented in a single execution module within a data select unit (DSU) as addressed further below, but the technique outlined is not limited to this design approach, More generally, in accordance with the present invention, a complex multi-cycle instruction can be instantiated within any of the VLIW execution unit slots.

These and other features, aspects and advantages of the invention will be apparent to those skilled in the art from the following detailed description taken together with the accompanying drawings.

BRIEF DESCRIPTION OF THE DRAWINGS

FIGS. 3 A and B illustrate an integer divide instruction encoding and syntax and operation descriptions in accordance with the present invention;

DETAILED DESCRIPTION

Further details of a presently preferred ManArray core, architecture, and instructions for use in conjunction with the present invention are found in U.S. patent application Ser. No. 08/885,310 filed Jun. 30, 1997, now U.S. Pat. No. 6,023,753, U.S. patent application Ser. No. 08/949,122 filed Oct. 10, 1997, now U.S. Pat. No. 6,167,502, U.S. patent application Ser. No. 09/169,255 filed Oct. 9, 1998, now U.S. Pat. No. 6,343,356, U.S. patent application Ser. No. 09/169,256 filed Oct. 9, 1998, now U.S. Pat. No. 6,167,501, U.S. patent application Ser. No. 09/169,072 filed Oct. 9, 1998, now U.S. Pat. No. 6,219,776, U.S. patent application Ser. No. 09/187,539 filed Nov. 6, 1998, now U.S. Pat. No. 6,151,668, U.S. patent application Ser. No. 09/205,558 filed Dec. 4, 1998, now U.S. Pat. No. 6,279,060, U.S. patent application Ser. No. 09/215,081 filed Dec. 18, 1998, now U.S. Pat. No. 6,101,592, U.S. patent application Ser. No. 09/228,374 filed Jan. 12, 1999 and entitled "Methods and Apparatus to Dynamically Reconfigure the Instruction Pipeline of an Indirect Very Long Instruction Word Scalable Processor", now U.S. Pat. No. 6,216,223, U.S. patent application Ser. No. 09/238,446 filed Jan. 28, 1999, now U.S. Pat. No. 6,366,999, U.S. patent application Ser. No. 09/267,570 filed Mar. 12, 1999, now U.S. Pat. No. 6,446,190, U.S. patent application Ser. No. 09/337,839 filed Jun. 22, 1999, U.S. patent application Ser. No. 09/350,191 filed Jul. 9, 1999, now U.S. Pat. No. 6,356,994, U.S. patent application Ser. No. 09/422,015 filed Oct. 21, 1999 entitled "Methods and Apparatus for Abbreviated Instruction and Configurable Processor Architecture", now U.S. Pat. No. 6,408,382, U.S. patent application Ser. No. 09/432,705 filed Nov. 2, 1999 entitled "Methods and Apparatus for Improved Motion Estimation for Video Encoding", U.S. patent application Ser. No. 09/471,217 filed Dec. 23, 1999 entitled "Methods and Apparatus for Providing Data Transfer Control", now U.S. Pat. No. 6,260,082, U.S. patent application Ser. No. 09/472,372 filed Dec. 23, 1999 entitled "Methods and Apparatus for Providing Direct Memory Access Control", U.S. patent application Ser. No. 09/996,103 entitled "Methods and Apparatus for Data Dependent Address Operations and Efficient Variable Length Code Decoding in a VLIW Processor" filed Jun. 16, 2000, now U.S. Pat. No. 6,397,324, U.S. patent application Ser. No. 09/598,567 entitled "Methods and Apparatus for Improved Efficiency in Pipeline Simulation and Emulation" filed Jun. 21, 2000, U.S. patent application Ser. No. 09/598,566 entitled "Methods and Apparatus for Generalized Event Detection and Action Specification in a Processor" filed Jun. 21, 2000, U.S. Provisional Application Ser. No. 60/140,224 entitled "Methods and Apparatus for Providing Manifold Array (ManArray) Program Context Switch with Array Reconfiguration Control" filed Jun. 21, 2000, and U.S. patent application Ser. No. 09/598,084 entitled "Methods and Apparatus for Establishing Port Priority Functions in a VLIW Processor" filed Jun. 21, 2000, as well as, Provisional Application Ser. No. 60/113,637 entitled "Methods and Apparatus for Providing Direct Memory Access (DMA) Engine" filed Dec. 23, 1998, Provisional Application Ser. No. 60/113,555 entitled "Methods and Apparatus Providing Transfer Control" filed Dec. 23, 1998, Provisional Application Ser. No. 60/139,946 entitled "Methods and Apparatus for Data Dependent Address Operations and Efficient Variable Length Code Decoding in a VLIW Processor" filed Jun. 18, 1999, Provisional Application Ser. No. 60/140,245 entitled "Methods and Apparatus for Generalized Event Detection and Action Specification in a Processor" filed Jun. 21, 1999, Provisional Application Ser. No. 60/140,163 entitled "Methods and Apparatus for Improved Efficiency in Pipeline Simulation and Emulation" filed Jun. 21, 1999, Provisional Application Ser. No. 60/140,162 entitled "Methods and Apparatus for Initiating and Re-Synchronizing Multi-Cycle SIMD Instructions" filed Jun. 21, 1999, Provisional Application Ser. No. 60/140,244 entitled "Methods and Apparatus for Providing One-By-One Manifold Array (1×1 ManArray) Program Context Control" filed Jun. 21, 1999, Provisional Application Ser. No. 60/140,325 entitled "Methods and Apparatus for Establishing Port Priority Function in a VLIW Processor" filed Jun. 21, 1999, Provisional Application Ser. No. 60/140,425 entitled "Methods and Apparatus for Parallel Processing Utilizing a Manifold Array (ManArray) Architecture and Instruction Syntax" filed Jun. 22, 1999, Provisional Application Ser. No. 60/165,337 entitled "Efficient Cosine Transform Implementations on the ManArray Architecture" flied Nov. 12, 1999, and Provisional Application Ser. No. 60/171,911 entitled "Methods and Apparatus for DMA Loading of Very Long Instruction Word Memory" filed Dec. 23, 1999, Provisional Application Serial No. 60/184,668 entitled "Methods and Apparatus for Providing Bit-Reversal and Multicast Functions Utilizing DMA Controller" filed Feb. 24, 2000, Provisional Application Ser. No. 60/184,529 entitled "Methods and Apparatus for Scalable Array Processor Interrupt Detection and Response" filed Feb. 24, 2000, Provisional Application Ser. No. 60/184,560 entitled "Methods and Apparatus for Flexible Strength Coprocessing Interface" filed Feb. 24, 2000, and Provisional Application Ser. No. 60/203,629 entitled "Methods and Apparatus for Power Control in a Scalable Array of Processor Elements" filed May 12, 2000, respectively, all of which are assigned to the assignee of the present invention and incorporated by reference herein in their entirety.

Figure 1:
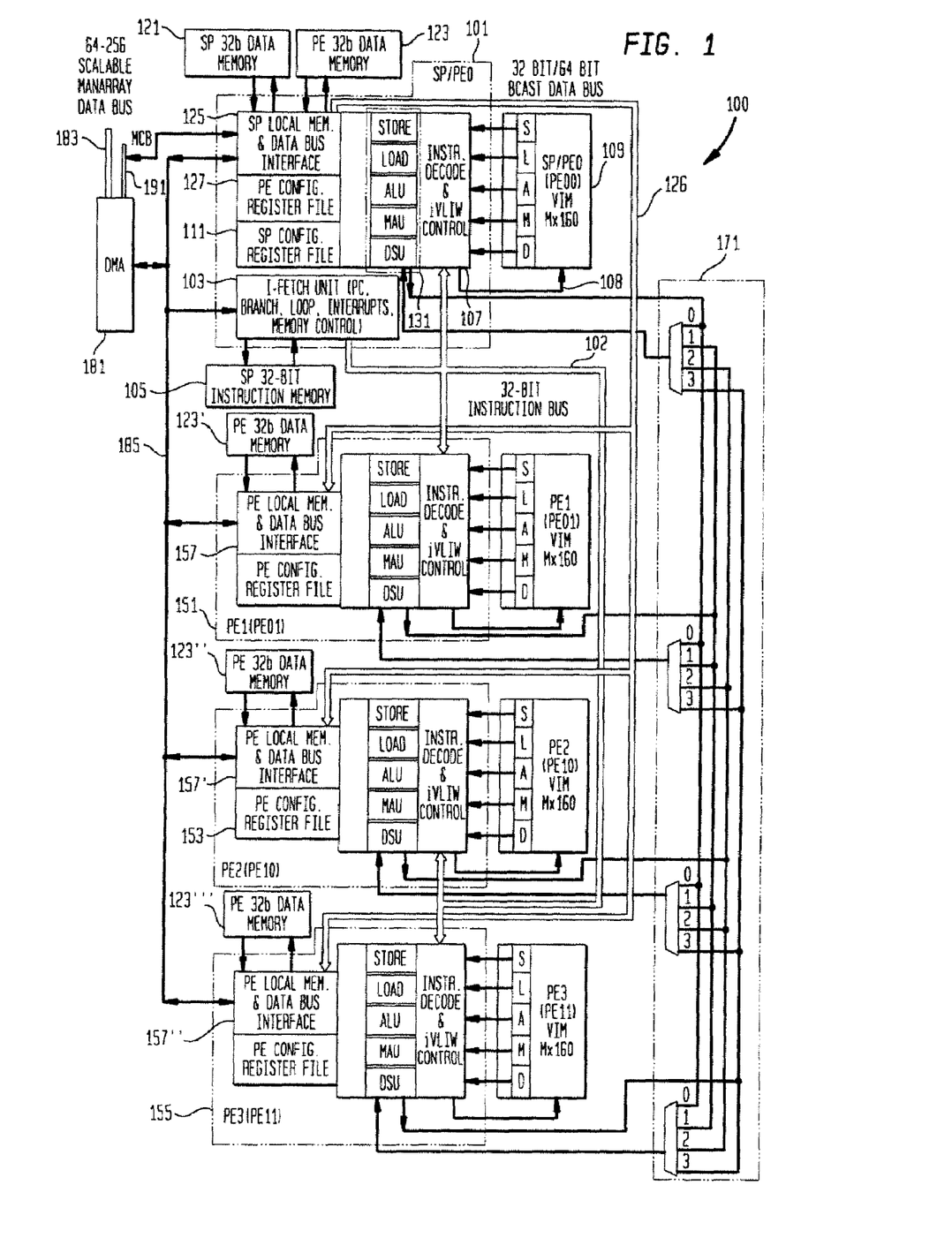
FIG. 1 illustrates an exemplary 2×2 ManArray iVLIW processor suitable for use in conjunction with the present invention.

In a presently preferred embodiment of the present invention, a ManArray 2×2 iVLIW single instruction multiple data stream (SIMD) processor 100 shown in FIG. 1 contains a controller sequence processor (SP) combined with processing element-0 (PE0) SP/PE0 101, as described in further detail in U.S. application Ser. No. 09/169,072 entitled "Methods and Apparatus for Dynamically Merging an Array Controller with an Array Processing Element". Three additional PEs 151, 153, and 155 are also utilized to demonstrate initiating and resynchronizing multi-cycle SIMD instructions in accordance with the present invention. It is noted that the PEs can also be labeled with their matrix positions as shown in parentheses for PE0 (PE00) 101, PE1 (PE01) 151, PE2 (PE10) 153, and PE3 (PE11) 155. The combined SP/PE0 101 contains a fetch controller 103 to allow the fetching of short instruction words (SIWs) from a 32-bit instruction memory 105. The fetch controller 103 provides the typical functions needed in a programmable processor such as a program counter (PC), branch capability, digital signal processing loop operations, and support for interrupts. It also provides instruction memory management control which could include an instruction cache if needed by an application. In addition, the SIW I-Fetch controller 103 dispatches 32-bit SIWs to the other PEs in the system by means of a 32-bit instruction bus 102.

In this exemplary system, common elements are used throughout to simplify the explanation, though actual implementations are not so limited. By way of example, the execution units 131 in the combined SP/PE0 101 can be separated into a set of execution units optimized for a particular control function, for example, fixed point execution units, and the PE0 as well as the other PEs 151, 153 and 155 can be optimized for a floating point application. For the purposes of this description, it is assumed that the execution units 131 are of the same type in the SP/PE0 and the other PEs. In a similar manner, SP/PE0 and the other PEs use a five instruction slot iVLIW architecture which contains a very long instruction word memory (VIM) 109 and an instruction decode and VIM controller function unit 107 which receives instructions as dispatched from the SP/PE0's I-Fetch unit 103 and generates the VIM addresses-and-control signals 108 required to access the iVLIWs stored in the VIM. These iVLIWs are identified by the letters SLAMD in VIM 109. The loading of the iVLIWs is described in further detail in U.S. patent application Ser. No. 09/187,539 entitled "Methods and Apparatus for Efficient Synchronous MIMD Operations with iVLIW PE-to-PE Communication". Also contained in the SP/PE0 and the other PEs is a common PE configurable register file 127 which is described in further detail in U.S. patent application Ser. No. 09/169,255 entitled "Methods and Apparatus for Dynamic Instruction Controlled Reconfiguration Register File with Extended Precision".

Due to the combined nature of the SP/PE0, the data memory interface controller 125 must handle the data processing needs of both the SP controller, with SP data in memory 121, and PE0, with PE0 data in memory 123. The SP/PE0 controller 125 also is the source of the data that is sent over the 32-bit or 64-bit broadcast data bus 126. The other PEs 151, 153, and 155 contain common physical data memory units 123', 123", and 123"' though the data stored in them is generally different as required by the local processing done on each PE. The interface to these PE data memories is also a common design in PEs 1, 2, and 3 and indicated by PE local memory and data bus interface logic 157, 157' and 157". Interconnecting the PEs for data transfer communications is the cluster switch 171, various presently preferred aspects of which are described in greater detail in U.S. Pat. No. 6,023,753 entitled "Manifold Array Processor", U.S. application Ser. No. 09/949,122 entitled "Methods and Apparatus for Manifold Array Processing", and U.S. application Ser. No. 09/169,256 entitled "Methods and Apparatus for ManArray PE-to-PE Switch Control". The interface to a host processor, other peripheral devices, and/or external memory can be done in many ways. A primary presently preferred mechanism shown for completeness is contained in a direct memory access (DMA) control unit 181 that provides a scalable ManArray data bus 183 that connects to devices and interface units external to the ManArray core. The DMA control unit 181 provides the data flow and bus arbitration mechanisms needed for these external devices to interface to the ManArray core memories via the multiplexed bus interface represented by line 185. A high level view of a ManArray Control Bus (MCB) 191 is also shown.

All of the above noted patents and applications are assigned to the assignee of the present invention and incorporated herein by reference in their entirety.

Turning now to specific details of the ManArray processor apparatus as adapted by the present invention, the inventive approach advantageously provides efficient implementation of more complex instructions and their multi-cycle execution units as described further below.

Figure 2A:
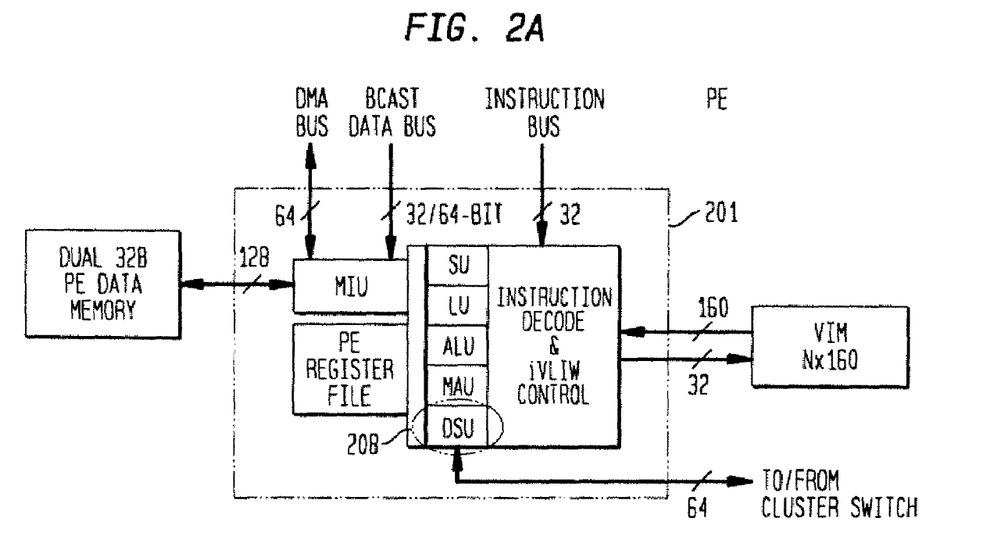
FIG. 2A illustrates further details of one of the PEs of FIG. 1.
Figure 2B:
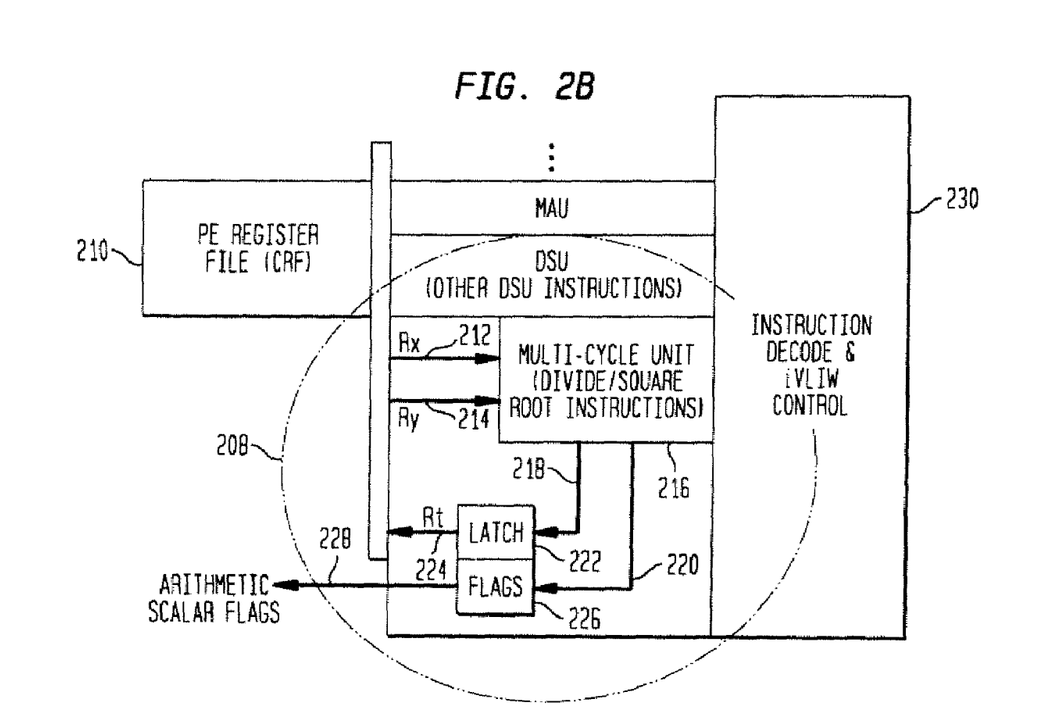
FIG. 2B illustrates an exemplary complex instruction divide/square root module operative in the DSU of the PEs of FIG. 1 suitable for use in the present invention.

FIG. 2A illustrates further details of a PE 201, suitable for use as one or more of the PEs of FIG. 1. FIG. 2B illustrates further aspects of a multi-cycle execution unit 216, specifically a divide and square root unit, incorporated in the DSU 208. The execution units read source operands from the CRF 210 and write results to the CRF 210. Such reading and writing is illustrated in FIG. 2B for the multi-cycle execution unit 216. As shown in FIG. 2B, execution unit 216 has source operand read paths Rx 212 and Ry 214. It also includes a result operand register 222 that holds results 218 and flag register 226. Flag register 226 holds the flags produced at output 220 of the multi-cycle execution unit 216 at the completion of the multi-cycle operation. It is noted that the source operands can be either 32-bits or 64-bits due to the ManArray reconfigurable register file design, and that in general other operand widths are not precluded. Flag register 226 is advantageously implemented as part of a status and control register (SCR1) that is part of a ManArray's miscellaneous register file (MRF). For the divide square root unit, the outputs of the result operand register, divide square root register (DSQR) 224 are stored in the CRF while the outputs of the flag register DC0, DN0, DV0, and DZ0 228 are stored as the CNVZ arithmetic scalar flags. In some cases, an additional result register, such as a register for storing the result of an integer remainder (MOD) instruction results in a remainder of a division operation described further below, is also utilized. A multi-cycle execution unit can be conditionally executed based upon the state of the condition flags that are checked in the initialization and resynchronization cycle of a multi-cycle instruction. In addition, if a multi-cycle instruction is issued prior to completion of the specified number of multi-cycle operations, then the multi-cycle unit stops execution of the previous instruction and initializes and resynchronizes to start the newly received multi-cycle instruction. The specific operation of the multi-cycle execution unit is described in further detail below for each of the exemplary instructions: integer divide (DIV), floating point divide (FDIV), floating point square root (FSQRT), floating point reciprocal (FCRP), and floating point reciprocal square root (FRSQRT).

Integer Divide

FIG. 3A illustrates a presenting preferred encoding format for an integer divide (DIV) instruction 300 in accordance with the present invention. FIG. 39 shows a syntax and operation table 310 for the DIV instruction 300 providing further details of its operation in accordance with the present invention. It is noted that in the first execution cycle for the syntax/operation 310 of FIG. 3B, the CNVZ flags and F0-F1 ACF flags are made available to the next instruction in the pipeline, but are actually written to SCR0 on the second execution cycle. This operation is similar to how all single-cycle arithmetic instructions operate. Additionally, the following table lists the arithmetic scalar flags affected during execution:

| | |
|---|---|
| N = | DN0 from SCR1 |
| Z = | DZ0 from SCR1 |
| V = | DV0 from SCR1 |
| C = | DC0 from SCR1 |
| DNx = | MSB of quotient |

-continued

| | |
|---|---|
| DZx = | 1 if quotient is zero, 0 otherwise |
| DVx = | 1 if quotient is saturated, 0 otherwise |
| DCx = | 1 if remainder is zero, 0 otherwise |

Further, the DIV instruction 300 takes 10 cycles to complete operation for a 32-bit word, and 6 cycles for a 16-bit dual halfword.

Execution of DIV instruction 300 by a PE, such as PE 201 of FIG. 2A may be summarized as follows: the result of a previously executed divide/square root unit instruction is copied from the DSQR 222 into the target CRF register and the saved divide arithmetic scalar flags 226 are copied from the DC0, DN0, DV0, and DZ0 fields in the SCR1 to the CNVZ arithmetic scalar flags in SCR0. The source operands are issued to the divide/square root module 216 in DSU 208 to produce an integer division quotient and a truncated remainder after a multi-cycle iteration. When the result is complete, the quotient is placed in DSQR 222, the truncated remainder is placed in the MODR, another register "latch" similar to DSQR 222, and the arithmetic flags generated are saved in the DCx, DNx, DVx, and DZx fields of the SCR1. The quotient results and arithmetic flags can be obtained by issuing another divide/square root instruction in the same PE or SP (see DSQR instruction example below for further details), or the results alone can be obtained by copying the DSQR or the MODR to a CRY register via a copy instruction (COPY). The copy instruction does not initiate or resynchronize a new multi-cycle operation. The MOD instruction produces an integer remainder is also used in the ManArray processor. The MODR or DSQR values are returned dependent upon the initiating and resynchronizing SIW. The function is further defined for corner cases of Rx/Ry as follows:

| | Rx | Ry | DSQR | MODR | Flags |
|---|---|---|---|---|---|
| Signed | + non-zero | 0 | max pos | 0 | C = 1, N = 0, V = 1, Z = 0 |
| | − non-zero | 0 | max neg | 0 | C = 1, N = 1, V = 1, Z = 0 |
| | 0 | 0 | 0 | 0 | C = 1, N = 0, V = 1, Z = 1 |
| Unsigned | non-zero | 0 | max # | 0 | C = 1, N = 1, V = 1, Z = 0 |
| | 0 | 0 | 0 | 0 | C = 1, N = 0, V = 1, Z = 1 |

EXAMPLE

```
!To obtain R2 = R0/R1
DIV.PD.1SW R3, R0, R1 ! Cycle-1, R3 gets DSQR result, divide unit
begins on R0/R1
<instr2>        ! Cycle-2 of DIV
<instr3>        ! Cycle-3 of DIV
<instr4>        ! Cycle-4 of DIV
<instr5>        ! Cycle-5 of DIV
<instr6>        ! Cycle-6 of DIV
<instr7>        ! Cycle-7 of DIV
<instr8>        ! Cycle-8 of DIV
<instr9>        ! Cycle-9 of DIV
<instr10>       ! Cycle-10 of DIV, DSQR/MODR gets result at
                  the end of this cycle
DIV.PD.1SW R2, R3, R4 ! R2 gets DSQR (DIV R0/R1), divide unit
begins on R3/R4
```

It is noted that the instructions, <instr2> through <instr10>, represent independent concurrently executing instructions in the DSU, where the multi-cycle execution unit is also located, that operate while the multi-cycle execution is occurring.

Floating Point Divide

Figure 4A:
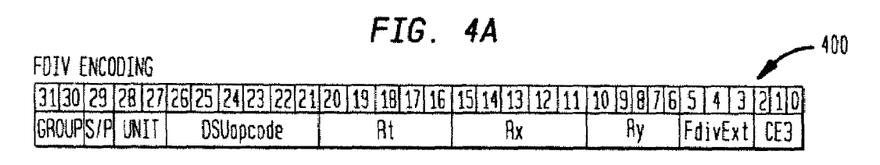
FIGS. 4A, B, and C illustrate aspects of a floating point divide instruction encoding, a floating point operations table, and a syntax and operation description for a floating point divide instruction in accordance with the present invention.
Figure 4B:
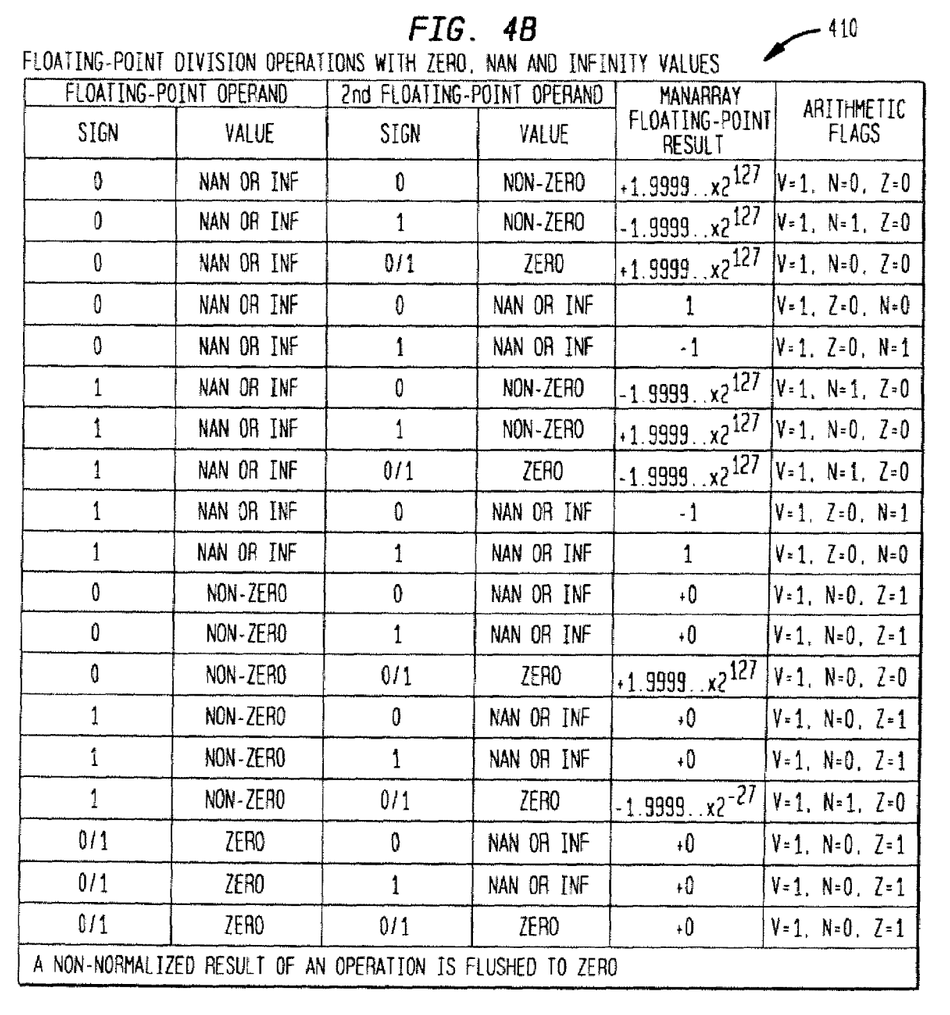
Figure 4C:
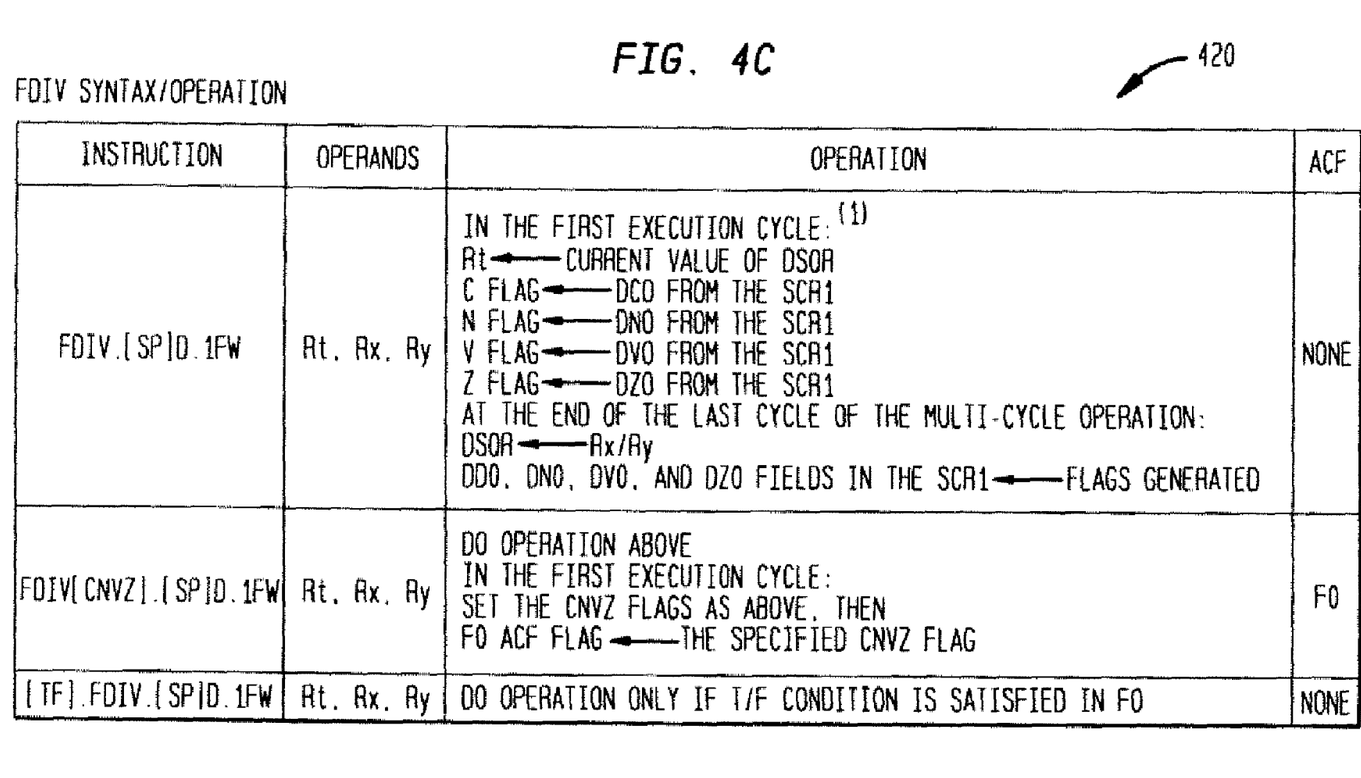

FIGS. 4A, 4B and 4C illustrate aspects of a presently preferred encoding of a floating point divide (FDIV) instruction 400, a floating point division operations table 410, and a syntax and operation table 420, respectively. For instruction 400, it is noted that in the first execution cycle the CNVZ flags and F0-F1 ACE flags are made available to the next instruction in the pipeline, but are actually written to SCR0 on the second execution cycle. Again, this operation is similar to how all single-cycle arithmetic instructions operate. The table which follows below lists the arithmetic scalar flags affected during execution of FDIV 400:

| | |
|---|---|
| N = | Current DN0 field from the SCR1. |
| Z = | Current DZ0 field from the SCR1. |
| V = | Current DV0 field from the SCR1. |
| C = | Current DC0 field from the SCR1. |
| DN = | MSB of multi-cycle result. |
| DZx = | 1 if a zero from multi-cycle result is generated, 0 otherwise. |
| DVx = | 1 if a saturate from multi-cycle result is generated, 0 otherwise. |
| DCx = | Not Affected. |

This execution takes 8 cycles.

Operation in accordance with the present invention may be illustrated as follows. In the first execution cycle of FDIV, the result of a previously executed divide/square root unit instruction is copied from the DSQR 222 into the target register and the saved flags are copied from the DC, DN, DV, and DZ fields in the SCR1 to the CNVZ arithmetic flags in SCR0. The source operands arc issued to the divide/square root module 216 in DSU 210 to produce a floating point division quotient after a multi-cycle iteration. When the result is complete, it is placed in DSQR 222, and the arithmetic flags generated are saved in the DC, DN, DV, and DZ fields of the SCR1. The results and arithmetic flags can be obtained by issuing another divide/square root instruction to divide/square root module 216 in the same PE or SP (see the DSQR instruction examples below for further details), or the results alone can be obtained by copying the DSQR to a compute register via a copy instruction (COPY). The copy instruction does not initiate or resynchronize a new multi-cycle operation. Both source registers are assumed to be in IEEE 754 compatible floating point format. The instruction 400 produces floating point (FP) results compatible with the IEEE 754 standard. For additional discussion of ManArray floating point operations, see the further discussions of floating point operations saturation, and overflow below. The instruction 400 executes in the DSU functional unit 210. The floating-point division operation table 410 of FIG. 4B illustrates operation with zero, NAN and infinity values. The following FDIV example serves to further illustrate various aspects of operation in accordance with the present invention.

FDIV EXAMPLE

```
!To obtain R2 = R0/R1
FDIV.PD.1FW R3, R0, R1 ! Cycle-1, R3 gets DSQR result, divide unit
begins on R0/R1
<instr2>        ! Cycle-2 of FDIV
<instr3>        ! Cycle-3 of FDIV
<instr4>        ! Cycle-4 of FDIV
<instr5>        ! Cycle-5 of FDIV
<instr6>        ! Cycle-6 of FDIV
<instr7>        ! Cycle-7 of FDIV
<instr8>        ! Cycle-8 of FDIV, DSQR/MODR gets result at
                  the end of this cycle
FDIV.PD.1FW R2, R3, R4 ! R2 gets DSQR (FDIV R0/R1), divide unit
begins on R3/R4
```

It is noted that the instructions, <instr2> through <instr8> above, represent independent concurrently executing instructions that operate while the multi-cycle execution is occurring.

Floating Point Square Root

Figure 5A:
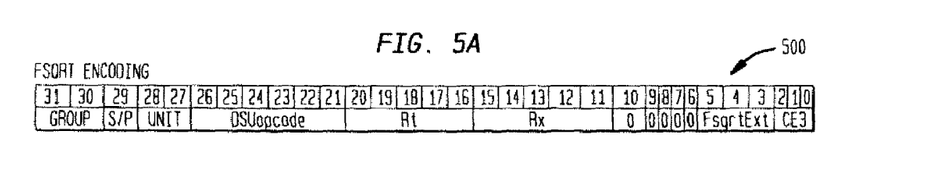
FIGS. 5A and B illustrate aspects of a floating point square root instruction encoding and a syntax and operation description in accordance with the present invention.
Figure 5B:
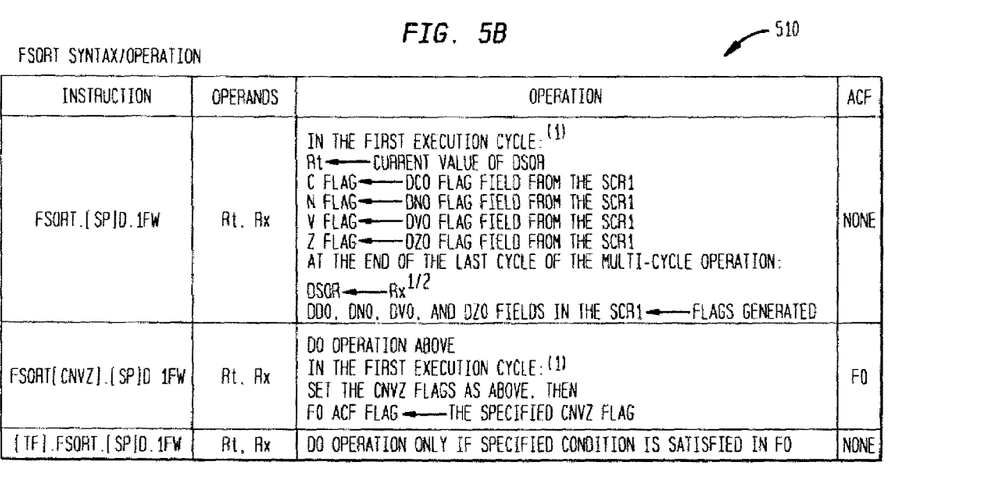

FIGS. 5A and 5B illustrate aspects of a presently preferred encoding of a floating point square root (FSQRT) instruction 500 and a syntax and operation table 510, respectively. It is noted for the instruction 500 that in the first cycle of execution the CNVZ flags and F0-F1 ACF flags are made available to the next instruction in the pipeline, but are actually written to SCR0 on the second execution cycle. This operation is similar to how all ManArray single-cycle arithmetic instructions operate. It is further noted that the following arithmetic scalar flags are affected during execution:

```
N =     Current DN0 field from the SCR1.
Z =     Current DZ0 field from the SCR1.
V =     Current DV0 field from the SCR1.
C =     Current DC0 field from the SCR1.
DNx =   MSB of multi-cycle result.
DZx =   1 if a zero from multi-cycle result is generated, 0 otherwise.
DVx =   1 if a saturate from multi-cycle result is generated, 0 otherwise.
DCx =   Not Affected.
```

For results that set both N=1 and Z=1, it is noted that the square root of a negative number is an imaginary number. When the operand is a negative number, this instruction produces a result as if the operand were a positive number, and it indicates that the result is imaginary by setting both the Negative (N) and Zero (Z) flags to 1. By way of example, imaginary numbers are frequently used in engineering to refer to a phase angle or phase value, the polar coordinate equivalent of Y-Axis values. Real numbers are used in polar coordinates associated with the X-Axis. Finally, FSQRT instruction 500 takes 8 cycles to operate.

Operation in accordance with the present invention may be illustrated as follows. The result of previously executed divide/square root unit instruction is copied from the DSQR 222 into the target register and the saved flags are copied from the DC, DN, DV, and DZ fields in the SCR1 to the CNVZ arithmetic flags in SCR0. The source operand is issued to the divide/square root module 216 in DSU 210 to produce a floating point square-root result after a multi-cycle iteration. When the result is complete, it is placed in DSQR 222 and the arithmetic flags generated are saved in the DN, DV, and DZ fields of the SCR1. The results and arithmetic flags can be obtained by issuing another divide/square root instruction to divide/square root module 216 in the same PE or SP (see DSQR instruction examples), or the results alone can be obtained by copying the DSQR to a compute register via a copy instruction (COPY). The copy instruction does not initiate or resynchronize a new multi-cycle operation. Both source registers are assumed to be in IEEE 754 compatible floating point format. The instruction 500 produces floating point (FP) results compatible with IEEE 754 standard. For additional discussion of ManArray floating point operations, see the Floating Point Operations, Saturation, and Overflow discussions herein. The instruction 500 executes in the DSU functional unit 210. The following table and example illustrate corner case floating-point square root (FSQRT) operations with zero, NAN and infinity values:

| Floating-Point Operand | | ManArray | Arithmetic |
|---|---|---|---|
| Sign | Value | Floating-Point Result | Flags |
| 0 | NAN or INF | $+1.9999\ldots \times 2^{127}$ | V = 1, N = 0, Z = 0 |
| 1 | NAN or INF | $-1.9999\ldots \times 2^{127}$ | V = 1, N = 1, Z = 0 |
| 1 | non-zero | $(ABS\ (Rx))^{1/2}$ | V = 0, N = 1, Z = 1 * |
| 0/1 | zero | +0 | V = 0, N = 0, Z = 1 |

A non-normalized result of an operation is flushed to zero. ABS = Absolute Value

FSQRT EXAMPLE

```
!To obtain R2 = sqrt(R0)
FSQRT.PD.1FW R3, R0 ! Cycle-1, R3 gets DSQR result, square-root unit
begins on R0
<instr2>        ! Cycle-2 of FSQRT
<instr3>        ! Cycle-3 of FSQRT
<instr4>        ! Cycle-4 of FSQRT
<instr5>        ! Cycle-5 of FSQRT
<instr6>        ! Cycle-6 of FSQRT
<instr7>        ! Cycle-7 of FSQRT
<instr8>        ! Cycle-8 of FSQRT, DSQR gets result at the end of
                  this cycle
FSQRT.PD.1FW R2, R3 ! R2 gets DSQR (FSQRT R0), square-root unit
begins on R3
```

It is noted that the instructions, <instr2> through <instr8>, represent independent concurrently executing instructions that operate while the multi-cycle execution is occurring.

Floating Point Reciprocal

Figure 6A:
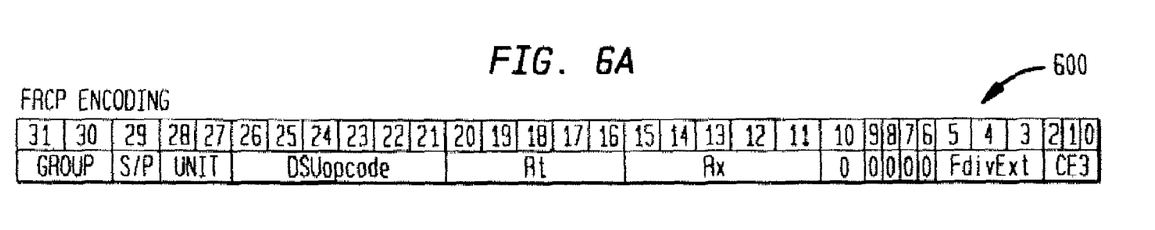
FIGS. 6A and B illustrate aspects of a floating point reciprocal instruction encoding and syntax and operation description for that instruction in accordance with the present invention.
Figure 6B:
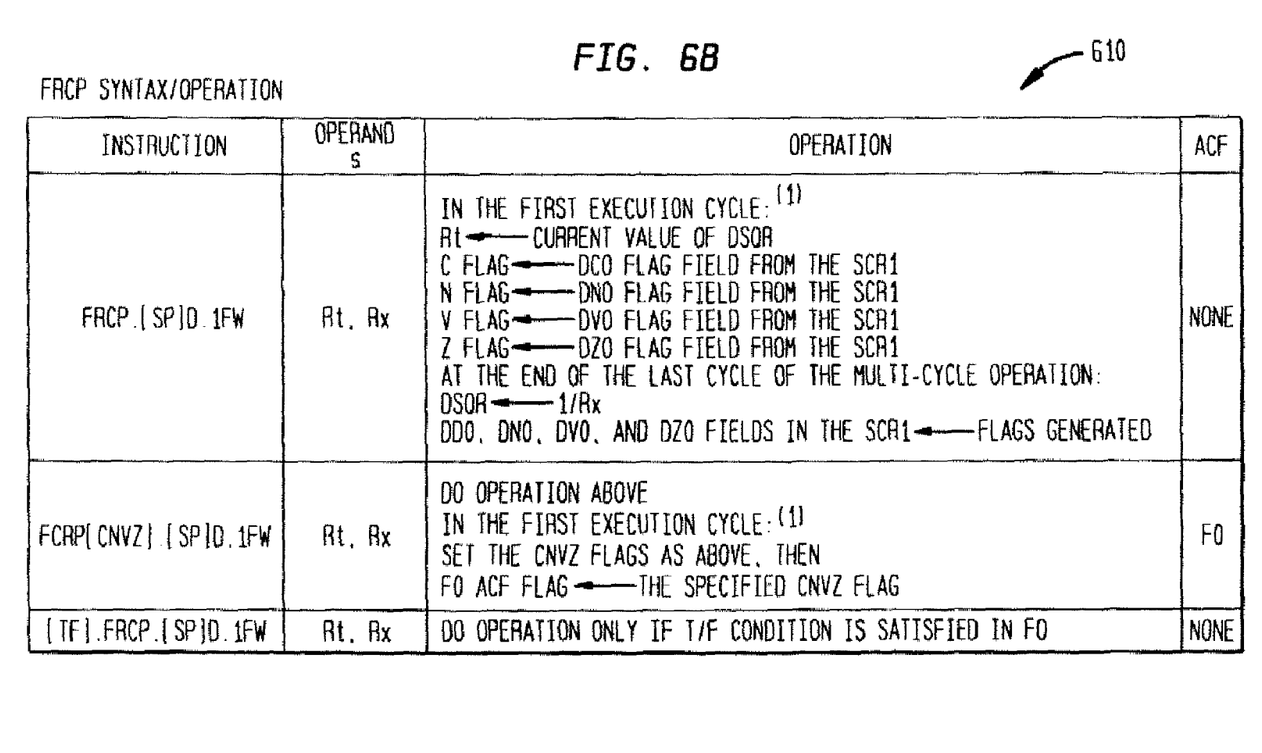

FIGS. 6A and 6B illustrate aspects of a presently preferred encoding of a floating point reciprocal (FRCP) instruction 600 and a syntax and operation table 610 for that instruction, respectively. It is noted for the instruction format for instruction 600 of FIG. 6A that in the first cycle of execution the CNVZ flags and F0-F1 ACF flags are made available to the next instruction in the pipeline, but are actually written to SCR0 on the second execution cycle. This operation is similar to how all single-cycle arithmetic instructions operate. Additionally, the following table lists the arithmetic scalar flags affected during execution:

| | |
|---|---|
| N = | Current DN0 field from the SCR1. |
| Z = | Current DZ0 field from the SCR1. |
| V = | Current DV0 field from the SCR1. |
| C = | Current DC0 field from the SCR1. |
| DNx = | MSB of multi-cycle result. |
| DZx = | 1 if a zero from multi-cycle result is generated, 0 otherwise. |
| DVx = | 1 if a saturate from multi-cycle result is generated, 0 otherwise. |
| DCx = | Not Affected. |

Further, the FRCP instruction 600 takes 8 cycles to complete.

Operation in accordance with the present invention proceeds as follows, The result of a previously executed divide/square root unit instruction is copied from the DSQR 222 into the target register and the saved flags are copied from the DC, DN, DV, and DZ fields in the SCR1 to the CNVZ arithmetic flags in SCR0. The source operand is issued to the divide/square root module 216 in DSU 210 to produce a floating point reciprocal (1/x) quotient after a multi-cycle iteration. When the result is complete, it is placed in DSQR 222, and the arithmetic flags generated are saved in the DN, DV, and DZ fields of the SCR1. The results and arithmetic flags can be obtained by issuing another divide/square root instruction to divide/square root module 216 in the same PE or SP (see DSQR instruction examples for further details), or the results alone can be obtained by copying the DSQR 222 to a compute register via a copy instruction (COPY). The copy instruction does not initiate or resynchronize a new multi-cycle operation. Both source registers are assumed to be in IEEE 754 compatible floating point format. The instruction 600 produces floating point (FP) results compatible with the IEEE 754 standard. For additional discussion of ManArray floating point operations, see the discussions of Floating Point operations, Saturation, and Overflow below. The instruction 600 executes in the DSU functional unit 210. The following table and example illustrate the corner case floating-point reciprocal operations with zero, NAN and infinity values:

| Floating-Point Operand | | ManArray | Arithmetic |
|---|---|---|---|
| Sign | Value | Floating-Point Result | Flags |
| 0 | NAN or INF | +0 | V = 1, N = 0, Z = 1 |
| 1 | NAN or INF | +0 | V = 1, N = 0, Z = 1 |
| 0/1 | zero | $+1.9999 \ldots \times 2^{127}$ | V = 1, N = 0, Z = 0 |

A non-normalized result of an operation is flushed to zero.

FRCP EXAMPLE

```
!To obtain R2 = R0/R1
FRCP.PD.1FW R3, R0, R1 ! Cycle-1, R3 gets DSQR result, divide unit
begins on R0/R1
<instr2>      ! Cycle-2 of FRCP
<instr3>      ! Cycle-3 of FRCP
<instr4>      ! Cycle-4 of FRCP
<instr5>      ! Cycle-5 of FRCP
<instr6>      ! Cycle-6 of FRCP
<instr7>      ! Cycle-7 of FRCP
<instr8>      ! Cycle-8 of FRCP, DSQR/MODR gets result at the end
                of this cycle
FRCP.PD.1FW R2, R3, R4 ! R2 gets DSQR (FRCP R0/R1), divide unit
begins on R3/R4
```

Figure 7A:
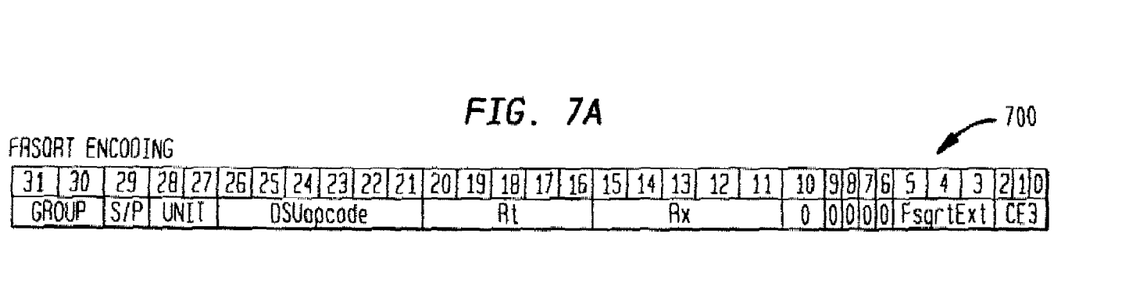
FIGS. 7A and B illustrate aspects of a floating point reciprocal square root encoding and syntax and operation description for such an instruction in accordance with the present invention.
Figure 7B:
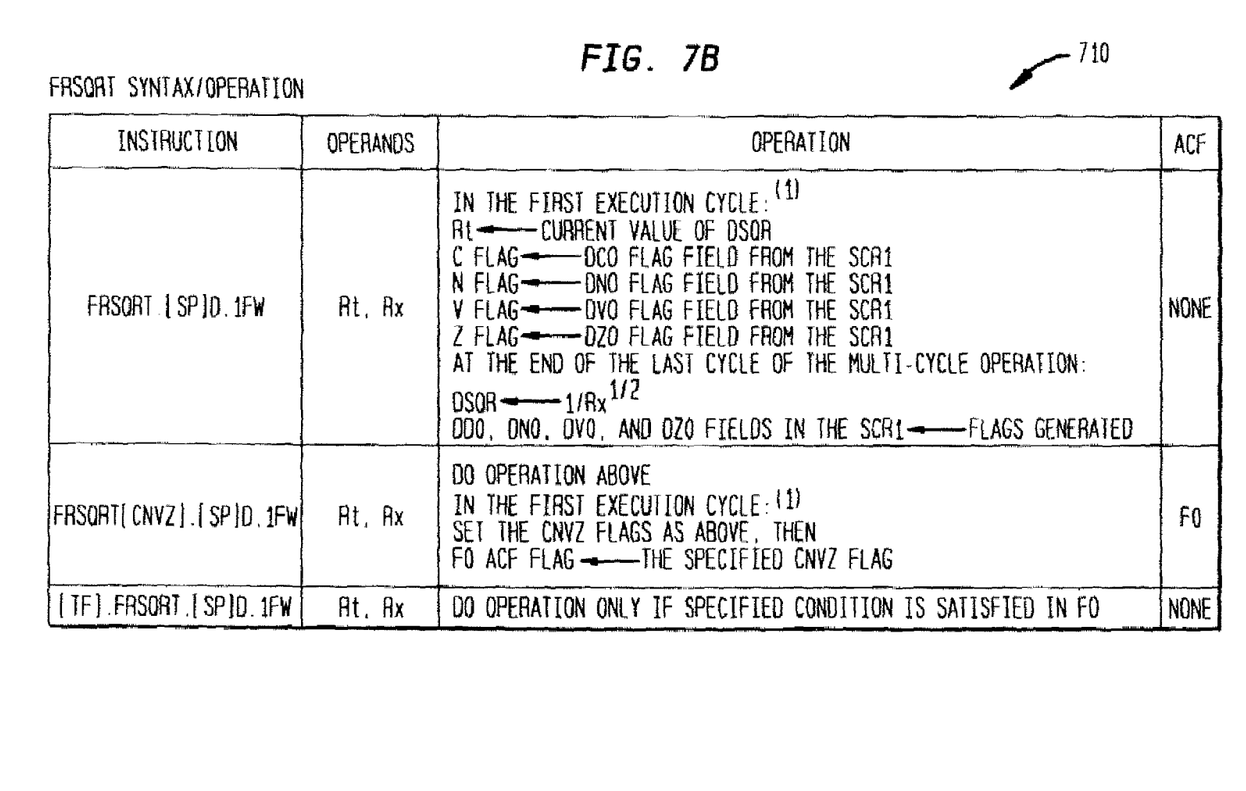

It is noted that the instructions, <instr2> through <instr8>, represent independent concurrently executing instructions that operate while the multi-cycle execution is occurring Floating Point Reciprocal Square Root FIGS. 7A and 7B illustrate aspects of a presently preferred encoding of a floating point reciprocal square root (FRSQRT) instruction 700 and a syntax and operation table 710 for that instruction, respectively. It is noted for instruction 700 that in the first cycle of execution the CNVZ flags and F0-F1 ACF flags are made available to the next instruction in the pipeline, but are actually written to SCR0 on the second execution cycle. This operation is similar to how all single-cycle arithmetic instructions operate. Additionally, the following table lists the arithmetic scalar flags affected during execution:

| | |
|---|---|
| N = | Current DN0 field from the SCR1. |
| Z = | Current DZ0 field from the SCR1. |
| V = | Current DV0 field from the SCR1. |
| C = | Current DC0 field from the SCR1. |
| DNx = | MSB of multi-cycle result. |
| DZx = | 1 if a zero from multi-cycle result is generated, 0 otherwise. |
| DVx = | 1 if a saturate from multi-cycle result is generated, 0 otherwise. |
| DCx = | Not Affected. |

It is further noted for results that set both N=1 and Z=1 that the square root of a negative number is an imaginary number. When the operand is a negative number, this instruction produces a result as if the operand were a positive number, and it indicates that the result is imaginary by setting both the negative (N) and zero (Z) flags to 1. By way of example, imaginary numbers are frequently used in engineering to refer to a phase angle or phase value, the polar coordinate equivalent of Y-Axis values. Real numbers are used in polar coordinates associated with the X-Axis. Finally, the FRSQRT instruction 700 takes 16 cycles to complete operation.

Operation in accordance with the present invention proceeds as follows. The result of a previously executed divide/square root unit instruction is copied from the DSQR 222 into the target register and the saved flags are copied from the DC, DN, DV, and DZ fields in the SCR1 to be utilized as the CNVZ arithmetic flags. The source operand is issued to the divide/square root module 216 in DSU 210 to produce a floating point reciprocal square-root result after a multi-cycle iteration. When the result is complete, it is placed in DSQR 222, and the arithmetic flags generated are saved in the DN, DV, and DZ fields of the SCR1. The results and arithmetic flags can be obtained by issuing another divide/square root instruction to divide/square root module 216 in the same PE or SP (see DSQR instruction examples), or the results alone can be obtained by copying the DSQR 222 to a compute register via a copy instruction (COPY). The copy instruction does not initiate or resynchronize a new multi-cycle operation. Both source registers are assumed to be in IEEE 754 compatible floating point format. The instruction 700 produces floating point (FP) results compatible with IEEE 754 standard. For additional discussion of ManArray floating point operations, see the discussions of Floating Point operations, Saturation, and Overflow below. The instruction 700 executes in the DSU functional unit 210. The following table and example illustrate the corner case floating-point reciprocal square root operations with zero, NAN and infinity values.

| Floating-Point Operand | | ManArray | Arithmetic |
| --- | --- | --- | --- |
| Sign | Value | Floating-Point Result | Flags |
| 0 | NAN or INF | +0 | V = 1, N = 0, Z = 1 |
| 1 | NAN or INF | +0 | V = 1, N = 0, Z = 1 |
| 1 | non-zero | $1/(ABS\ (Rx))^{1/2}$ | V = 0, N = 1, Z = 1 * |
| 0/1 | zero | $+1.9999\ldots \times 2^{127}$ | V = 1, N = 0, Z = 0 |

A non-normalized result of an operation is flushed to zero.
ABS = Absolute Value

FRSQRT EXAMPLE

```
!To obtain R2 = 1/sqrt(R0)
FRSQRT.PD.1FW R3, R0 ! Cycle-1, R3 gets DSQR result,
square-root unit begins on R0
<instr2>            ! Cycle-2 of FRSQRT
<instr3>            ! Cycle-3 of FRSQRT
...
<instr15>           ! Cycle-15 of FRSQRT
<instr16>           ! Cycle-16 of FRSQRT, DSQR gets result at
                      the end of this cycle
FRSQRT.PD.1FW R2, R3 ! R2 gets DSQR (FRSQRT R0), square-root
unit begins on R3
```

It is noted that the instructions, <instr2> through <instr16>, represent independent concurrently executing instructions that operate while the multi-cycle execution is occurring.

Floating Point Operations, Saturation and Overflow

Figure 8:
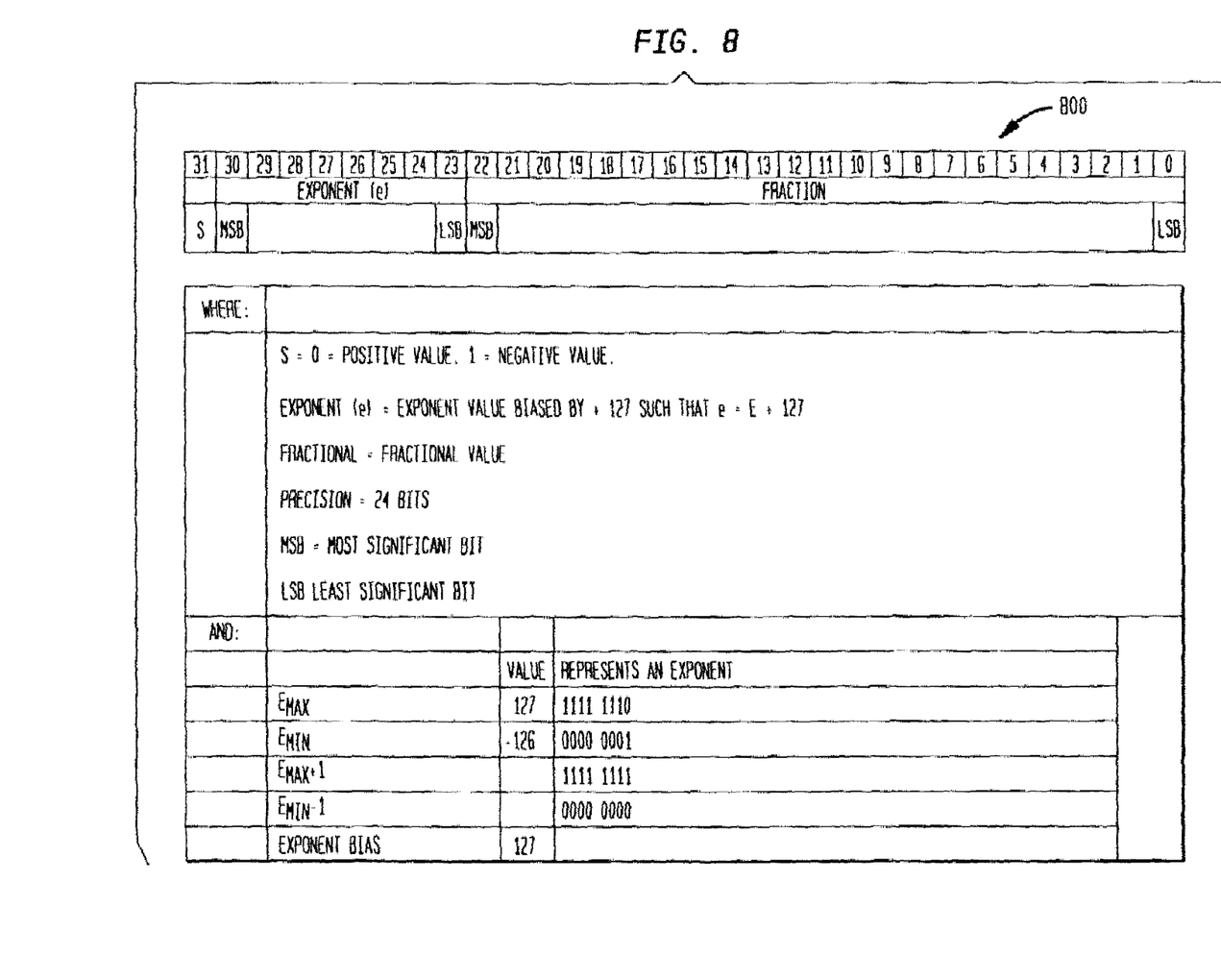
FIG. 8 shows a floating point format table of a floating point format suitable for use in conjunction with the present invention.

ManArray Floating Point operations constitute a subset of the IEEE 754 (1) basic 32 bit format single precision floating point standard data type, as shown in encoding format table 800 of FIG. 8.

The IEEE 754 Basic Standard provides for the numerical representations shown in the lefthand portion of the table below:

| Sign | Exponent, e | Fraction | Represents IEEE | ManArray output results | CNVZ Flags |
| --- | --- | --- | --- | --- | --- |
| s = 0 | $e = E_{min} - 1$ | f = 0 | +0 | +0 | Z = 1, N = 0 |
| s = 1 | $e = E_{min} - 1$ | f = 0 | −0 | Flushed to +0 (s = 0) | Z = 1, N = 0 |
| — | $e = E_{min} - 1$ | f ≠ 0 | $\pm 0.f \times 2^{Emin}$ | Flushed to +0 (s = 0) | Z = 1, N = 0 |
| — | $E_{min} \geq e \geq E_{max}$ | — | $1.f \times 2^{e-127}$ | $1.f \times 2^{e-127}$ | N = s |
| — | $e = E_{max} + 1$ | f = 0 | ±∞ | Clamped to $\pm 1.f_{max} \times 2^{Emax}$ | V = 1, N = s |
| — | $e = E_{max} + 1$ | f ≠ 0 | NaN | Clamped to $\pm 1.f_{max} \times 2^{Emax}$ | V = 1, N = s |

Values shown illustrate some differences between the IEEE 754 standard and the exemplary ManArray implementation, shown in the right two columns. The ManArray floating point instructions FDIV 400, FSQRT 500, FRCP 600 and FRSQRT 700 produce results compatible with the IEEE 754 standard as shown above. ManArray floating point operations produce outputs within a range of $-2^{128} < value < +2^{128}$. ManArray floating point values approach zero such that the smallest non-zero positive value produced is $2^{-126}$, the largest negative value is $-2^{-26}$. Positive and negative infinity, "Not A Numbers" (NAN), negative zero representations, and non-normalized fractional values will not be produced (see table above). Source registers are assumed to be in IEEE 754 floating point compatible format. It is noted that other forms of numerical processing, such as multi-cycle operation on integer values, are fully supported by this invention.

The IEEE 754 standard referred to above is more fully referred to as follows: ANSI/IEEE Standard 754-1985, IEEE Standard for Binary Floating-Point Arithmetic, 1985 by The Institute of Electrical and Electronics Engineers, Inc. , New York, N.Y. This standard is incorporated by reference herein in its entirety. Further details of such operation are found, for example, in *Computer Architecture A Quantitative Approach* (2nd Ed.) by David A. Patterson and John L. Hennessy, 1990, 1996 by Morgan Kaufmann Publishers, Inc. at Page A-14, and U.S. Provisional Application Ser. No. 60/140,425 entitled "Methods and Apparatus for Parallel Processing Utilizing a Manifold Array (ManArray) Architecture and Instruction Syntax" and filed Jun. 22, 1999, and U.S. application Ser. No. 09/599,980 entitled "Methods and Apparatus for Parallel Processing Utilizing a Manifold Array (ManArray) Architecture and Instruction Syntax" and filed on Jun. 22, 2000 for instruction references for DIV, FDIV, FSQRT, FRCP, and FRSQRT and ManArray floating point reference documentation contained therein which is also incorporated by reference herein.

While the present invention has been disclosed in the context of various aspects of presently preferred embodiments, it will be recognized that the invention may be suitably applied to other environments and applications consistent with the claims which follow.

We claim:

1. An apparatus for executing multi-cycle instructions comprising:
    a first execution module for executing a first multi-cycle instruction to generate a first execution module result at the completion of a predetermined number of cycles, wherein the predetermined number of cycles is based upon the complexity of the function specified by the first multi-cycle instruction;
    a first instruction result register coupled to the first execution module for storing the first execution module result; and
    a register file coupled to the first instruction result register for storing the contents of the first instruction result register in the register file at a target register location specified by the first multi-cycle instruction prior to generating the first execution module result.

2. The apparatus of claim 1 wherein upon receiving a second multi-cycle instruction after the first execution module results have been generated, the first execution module results are stored in the register file at a second target register location specified by the second multi-cycle instruction prior to generating the results for the second multi-cycle instruction.

3. The apparatus of claim 1 wherein upon receiving a second multi-cycle instruction prior to generating the first execution module results, the first execution module stops execution of the first multi-cycle instruction and resynchronizes the first execution module to initiate execution of the second multi-cycle instruction.

4. The apparatus of claim 1 wherein the predetermined number of cycles is three or more cycles.

5. The apparatus of claim 1 further comprising:
a second execution module for executing a second instruction in less than or equal to the predetermined number of cycles to generate a second execution module result, the second execution module operating in parallel with the first execution module, the second instruction specifying a target register location in the register file for storing the second execution module results at the end of executing the second instruction.

6. The apparatus of claim 1 further comprising:
a flag register coupled to the first execution module for storing first execution module flags generated by the first execution module upon the completion of executing the first multi-cycle instruction.

7. The apparatus of claim 6 further comprising:
arithmetic flags and condition flags coupled to the flag register to provide previously set arithmetic and condition information, wherein a multi-cycle instruction is conditionally executed based upon the state of the condition flags.

8. The apparatus of claim 6 wherein the first execution module is an integer divide unit for executing a multi-cycle integer divide instruction to generate an integer divide result as the first execution module result and generate divide arithmetic flags as the first execution module flags.

9. The apparatus of claim 6 wherein the first execution module is a floating point divide (FDIV) unit for executing a multi-cycle FDIV instruction to generate a FDIV result as the first execution module result and generate FDIV arithmetic flags as the first execution module flags.

10. The apparatus of claim 6 wherein the first execution module is a floating point square root (FSQRT) unit for executing a multi-cycle FSQRT instruction to generate a FSQRT result as the first execution module result and generate FSQRT arithmetic flags as the first execution module flags.

11. The apparatus of claim 6 wherein the first execution module is a floating point reciprocal (FRCP) unit for executing a multi-cycle FRCP instruction to generate a FRCP result as the first execution module result and generate FRCP arithmetic flags as the first execution module flags.

12. The apparatus of claim 6 wherein the first execution module is a floating point reciprocal square root (FRSQRT) unit for executing a multi-cycle FRSQRT instruction to generate a FRSQRT result as the first execution module result and generate FRSQRT arithmetic flags as the first execution module flags.

13. The apparatus of claim 6 wherein the first execution module supports execution of one or more of the following multi-cycle instructions: floating point divide (FDIV), floating point square root (FSQRT), floating point reciprocal (FRCP), and floating point reciprocal square root (FRSQRT).

14. A method for executing multi-cycle instructions comprising:
executing a first multi-cycle instruction in a first execution module to generate a first execution module result at the completion of a predetermined number of cycles, wherein the predetermined number of cycles is based upon the complexity of the function specified by the first multi-cycle instruction;

storing the first execution module result in a first instruction result register coupled to the first execution module; and storing the contents of the first instruction result register in a register file coupled to the first instruction result register at a target register location specified by the first multi-cycle instruction prior to generating the first execution module result.

15. The method of claim 14 further comprising:
receiving, after the first execution module results have been generated, a second multi-cycle instruction that specifies a second target registers location;
storing the first execution module results in the register file at the second target register location prior to generating results for the second multi-cycle instruction; and
executing the second multi-cycle instruction on the first execution module.

16. The method of claim 14 further comprising:
receiving a second multi-cycle instruction prior to generating the first execution module results;
stopping execution of the first multi-cycle instruction on the first execution module; and
resynchronizing the first execution module to initiate execution of the second multi-cycle instruction.

17. The method of claim 14 further comprising:
storing first execution module flags generated by the first execution module upon the completion of executing the first multi-cycle instruction in a flag register coupled to the first execution module.

18. The method of claim 14 wherein the first execution module is an integer divide unit for executing a multi-cycle integer divide instruction to generate an integer divide result as the first execution module result and generate divide arithmetic flags as the first execution module flags.

19. The method of claim 14 wherein the-first execution module is a floating point divide (FDIV) unit for executing a multi-cycle FDIV instruction to generate a FDIV result as the first execution module result and generate FDIV arithmetic flags as the first execution module flags.

20. A method of executing multi-cycle floating point instructions comprising:
executing a first multi-cycle floating point (FP) instruction in a first FP execution module to generate a first FP execution module result and arithmetic flags at the completion of a first number of cycles, wherein the first number of cycles is based upon the complexity of the floating point function specified by the FP instruction;
storing the first FP execution module result in a first FP instruction result register coupled to the first FP execution module and the arithmetic flags in a flag register coupled to the first execution FP execution module; and
storing the contents of the first FP instruction result register in a register file coupled to the first FP instruction result register at a target register location specified by the first multi-cycle FP instruction prior to generating the first FP execution module result.

21. The method of claim 20 further comprising:
executing a second FP instruction in a second FP execution module to generate a second FP execution module result and arithmetic flags at the completion of a second number of cycles, wherein the second number of cycles is based on the complexity of the FP function specified by the second FP instruction and is independent of the first number of cycles; and storing the second FP execution module result in a register file coupled to the second FP execution module at a target register location specified by the second multi-cycle FP instruction at completion of generating the second FP execution module result.

22. The method of claim 20 further comprising:

copying the contents of the first FP instruction result register in a register file coupled to the first FP instruction result register at a target register location specified by a copy instruction.

* * * * *